US011627126B2

(12) United States Patent
Thomas et al.

(10) Patent No.: US 11,627,126 B2
(45) Date of Patent: Apr. 11, 2023

(54) EXPEDITED AUTHORIZATION AND ACCESS MANAGEMENT

(71) Applicant: Bank of America Corporation, Charlotte, NC (US)

(72) Inventors: Tinku Thomas, London (GB); Paul Joseph Harding, Langdon Hills (GB); David Patrick Harte, Hook (GB); Reuben Oliver Wells, Tonbridge (GB)

(73) Assignee: Bank of America Corporation, Charlotte, NC (US)

( * ) Notice: Subject to any disclaimer, the term of this patent is extended or adjusted under 35 U.S.C. 154(b) by 228 days.

(21) Appl. No.: 16/998,127

(22) Filed: Aug. 20, 2020

(65) Prior Publication Data

US 2022/0060470 A1    Feb. 24, 2022

(51) Int. Cl.
*H04L 9/40* (2022.01)

(52) U.S. Cl.
CPC .......... *H04L 63/0853* (2013.01); *H04L 63/04* (2013.01); *H04L 63/0807* (2013.01); *H04L 63/0815* (2013.01); *H04L 63/102* (2013.01); *H04L 63/105* (2013.01)

(58) Field of Classification Search
CPC ... H04L 63/04; H04L 63/0815; H04L 63/102; H04L 63/101; H04L 63/0853; H04L 63/0807
See application file for complete search history.

(56) References Cited

U.S. PATENT DOCUMENTS

| 6,377,281 | B1* | 4/2002 | Rosenbluth | G06F 3/0481 |
| | | | | 345/473 |
| 6,697,806 | B1* | 2/2004 | Cook | H04W 12/084 |
| | | | | 709/227 |
| 6,820,236 | B1 | 11/2004 | Bates et al. | |
| 7,100,195 | B1* | 8/2006 | Underwood | H04L 63/0823 |
| | | | | 707/999.009 |
| 8,136,148 | B1* | 3/2012 | Chayanam | G06F 21/34 |
| | | | | 715/780 |

(Continued)

OTHER PUBLICATIONS

C. Badii, P. Bellini, A. Difino and P. Nesi, "Privacy and Security Aspects on a Smart City IoT Platform," (SmartWorld/SCALCOM/UIC/ATC/CBDCom/IOP/SCI), 2019, pp. 1371-1376. (Year: 2019).*

(Continued)

*Primary Examiner* — Kari L Schmidt
(74) *Attorney, Agent, or Firm* — Banner & Witcoff, Ltd.

(57) ABSTRACT

Aspects of the disclosure relate to simplified and expedited processing of access requests to network resources. Authorized individuals can set rules for accessing network resources. The rules can be implemented as a series of macro steps assigned to various access rights and can be consolidated in a single button or widget for a particular user group. In response to a user's one-click selection of the button or widget, all applicable access rights can be requested sequentially from appropriate services or individuals without requiring complex instructions or myriad user actions. User interfaces and API(s) are provided to enable users to request access and managers to setup access requirements and button configurations. Novel logical systems, architectures, platforms, graphical user interfaces, and methods are disclosed.

9 Claims, 10 Drawing Sheets

(56) References Cited

U.S. PATENT DOCUMENTS

| | | | |
|---|---|---|---|
| 8,166,003 B2 | 4/2012 | Friesenhahn et al. | |
| 8,914,013 B2* | 12/2014 | Dabbiere | H04M 15/8038 |
| | | | 455/418 |
| 10,277,601 B1* | 4/2019 | Higgins | G06F 21/6218 |
| 10,339,156 B2 | 7/2019 | Hawa et al. | |
| 10,417,586 B2* | 9/2019 | Mattox | G06F 16/40 |
| 11,030,295 B2* | 6/2021 | Madina | G06F 9/547 |
| 2004/0230536 A1* | 11/2004 | Fung | G06Q 40/00 |
| | | | 705/64 |
| 2007/0150741 A1* | 6/2007 | Kaler | H04L 63/123 |
| | | | 713/182 |
| 2007/0174113 A1* | 7/2007 | Rowen | G06Q 30/0223 |
| | | | 705/14.1 |
| 2007/0233685 A1* | 10/2007 | Burns | G06F 16/9038 |
| | | | 707/999.009 |
| 2009/0178125 A1* | 7/2009 | Barber | H04L 63/0407 |
| | | | 726/6 |
| 2010/0235762 A1* | 9/2010 | Laiho | G06F 16/972 |
| | | | 715/753 |
| 2012/0324242 A1* | 12/2012 | Kirsch | G06F 21/6245 |
| | | | 713/189 |
| 2013/0073998 A1* | 3/2013 | Migos | G06F 40/166 |
| | | | 715/776 |
| 2013/0097654 A1* | 4/2013 | Aciicmez | G06F 21/10 |
| | | | 726/1 |
| 2014/0032758 A1* | 1/2014 | Barton | H04W 12/37 |
| | | | 709/225 |
| 2014/0282975 A1* | 9/2014 | Linszner | H04L 63/083 |
| | | | 726/7 |
| 2014/0368880 A1* | 12/2014 | Venugopal | G06F 3/1286 |
| | | | 358/1.15 |
| 2016/0142399 A1* | 5/2016 | Pace | G06F 21/41 |
| | | | 726/4 |
| 2016/0239999 A1* | 8/2016 | Silberstein | G06T 17/00 |
| 2016/0294810 A1* | 10/2016 | Wang | H04L 63/0815 |
| 2016/0328569 A1* | 11/2016 | Lee | G06F 21/62 |
| 2017/0213200 A1* | 7/2017 | Purves | G07G 1/01 |
| 2018/0150650 A1 | 5/2018 | Saunders et al. | |
| 2018/0246983 A1* | 8/2018 | Rathod | G06F 16/9566 |
| 2019/0272281 A1 | 9/2019 | Hawa et al. | |
| 2020/0053094 A1* | 2/2020 | Kaube | G06F 9/44526 |
| 2020/0153928 A1* | 5/2020 | Chauhan | H04L 67/1063 |
| 2020/0394307 A1* | 12/2020 | Swedlund | G06F 16/958 |
| 2020/0401382 A1* | 12/2020 | Briggs | G06N 5/04 |
| 2020/0401684 A1* | 12/2020 | Vath | G16H 10/60 |
| 2021/0064769 A1* | 3/2021 | Yu | G06F 21/31 |
| 2021/0112059 A1* | 4/2021 | Heldman | H04L 67/10 |
| 2021/0234898 A1* | 7/2021 | Desai | H04L 61/2557 |

OTHER PUBLICATIONS

Chaoshun Zuo, Qingchuan Zhao, and Zhiqiang Lin. CCS '17: Proceedings of the 2017 ACM SIGSAC Conference on Computer and Communications Security. Oct. 2017 pp. 799-813 (Year: 2017).*

* cited by examiner

EXPEDITED AUTHORIZATION AND ACCESS MANAGEMENT

TECHNICAL FIELD OF DISCLOSURE

Aspects of the disclosure relate to systems, methods, and apparatus for the prevention of unauthorized access to resources of a system or information system, including the manner of identifying and verifying the entity, process, or mechanism requesting access to the resource.

BACKGROUND

Placing access requests for resources, such as software applications, software source code or other protected resources, can be a time-consuming and confusing process in large companies employing best practices for information security, because there are often myriad users, groups, development teams, managers, complex approval processes, projects, business rules, access rights, access right groups, and/or internal firewalls in the company between individuals, groups, and projects. Even placing a request for one single group can require a number of clicks though multiple pages and/or filling out complicated forms on the pages. Owing to the high level of flexibility available in request tools and restrictions on how things are displayed, it is not uncommon for people to actually need complex instructions on how to request access to various resources. As a result, resource owners or managers often have to create comprehensive instructions describing how to request access to their apps. These are often extensive and can be three, four, or more pages in length. Moreover, often the items required are a single group or role, but there is no easy way to share this item in order to place the access request. Additionally, is it common for teams to create new joiner documents, either in custom PDFs or wiki pages, that list all the access rights that new users need in order to achieve access to resources and provide the comprehensive details explaining how to acquire all of the requisite access rights.

As a simple example, even requesting Wi-Fi access to a secure company network is usually extremely complicated and requires detailed instructions for persons requesting access. It is not as easy as merely selecting a Wi-Fi network and entering a password like a person might do with their home network. Instead, in a company with sophisticated information security, requesting employee access to a network often requires multiple pages of comprehensive instructions that attempt to explain to users how to navigate to access right management (ARM) websites, request guest/employee access, modify rights, select request type, select platform, navigate various platforms such as Windows—Groups, Windows—Multiple Group Requests, Windows Primary ID and Standard ID, etc., select domains, select action types, provide account IDs, search security groups, filter results by group name, manually enter complete access point names, and so on. This is similarly true for requesting access to any other type of company resource, not just for Wi-Fi access. This wastes valuable time for developers who manage resources and have to provide instructions on how to access the resources and respond to access requests as well as wastes the time of users attempting to access resources. Furthermore, the process is extremely complicated, technically difficult, frustrates users, and is very counterproductive.

This disclosure addresses one or more of the shortcomings in the industry to overcome the foregoing technical problems as well as obviate the technical issues referenced below.

SUMMARY

Aspects of the disclosure provide effective, efficient, scalable, and convenient technical solutions that address and overcome the technical problems associated with maintaining information security, managing resource access rights, and providing streamlined approval and provisioning of resources.

In some embodiments, a computer-implemented method for a host computing machine to manage access by a user computing machine of a network resource can be used. The network resource can be located inside a firewall in a network or external to the firewall. Similarly, the user computing machine may be inside a firewall or external to it. The host computing machine, user computing machine, and network resource can be coupled directly or indirectly to a network. The host computing machine can receive from the user computing machine a request for access to a host page. The host computing machine can load a frame, such as an iFrame or other structure, corresponding to the host page request. The host computing machine can transmit, to the user computing machine, the frame in order to display the host page. The host computing machine can load a button configuration. A user identification can be queried by the host computing machine in order to identify and authenticate the user. The user computing machine can provide to the host computing machine the user identification via an authentication token. The host computing machine can determine whether the user computing machine is eligible to access the network resource based on the authentication token. If the user computing machine is not eligible to access the network resource, the host computing machine can provide a notification that the network resource is not available based on the user identification. If the user computing machine is eligible to access the network resource, the host computing machine can determine whether the user computing machine already has access to the network resource. If the user computing machine already has access to the network resource, the host computing machine can provide a notification that the user computing machine already has access to the network resource, the host computing machine can allow the user computing machine to access the network resource. If the user computing machine does not already have access to the network resource, the host computing machine can render a button based on the button configuration. The host computing machine can display, on the host page, the button to allow the user computing machine to request all access rights required access to the network resource in conjunction with the frame. The host computing machine can receive from the user computing machine an indication that the button was clicked and that the user is requesting all access rights required to access the network resource. The host computing machine can generate an access request for the network resource and can transmit the access request for approval. The host computing machine can generate a confirmation ticket corresponding to the access request and can transmit the confirmation ticket corresponding to the access request to the user.

In some embodiments, the host computing machine can transmit the access request for approval to at least one administrator computing machine that is also coupled to the network.

In some embodiments, the button configuration can correspond to macro instructions to secure all access rights required in order for the user or user computing machine to access the network resource.

In some embodiments, some or all of the macro instructions are executed by the host computing machine if the host computing machine receives an indication that the button was clicked.

In some embodiments, the host page displays access instructions for the network resource. The access instructions can be tailored to the particular user requesting access or can generally be directed to the user group to which the user belongs.

In some embodiments, authentication tokens used to identify and/or authenticate a user can be single sign-on authentication tokens.

In some embodiments, different colors for widgets or buttons can be used to indicate various submission options or the status of requests.

In some embodiments, a non-transitory computer-readable medium can be provided with computer-executable instructions stored thereon executed by a processor on an access right management computing machine to control access by a user operating a user computing machine of a network resource. The access right management computing machine and user computing machine can be coupled to a network. Various computer-executable instructions and/or modules can be implemented. Single sign-on authentication instructions can be used for the access right management computing machine to authenticate and identify the user. Widget configuration instructions can be implemented for the access right management computing machine to generate an access right management macro containing a plurality of all macro steps required for the user to secure all access rights required access to the network resource. Host page generation instructions can be used for the access right management computing machine to generate an asset right management graphical user interface (GUI) containing a user-selectable graphical widget corresponding to the access right management macro. User input instructions can allow the user to select the graphical widget on the user computing machine and generate a request for the network resource. Macro execution instructions on the access right management computing machine can trigger execution of the plurality of macro steps required for the user to secure all access rights to the network resource when the user selects the graphical widget on the user computing machine. If the plurality of macro steps are successfully executed to obtain all of access rights because the user is authorized to access the network resource, approval instructions can be used for the access right management computing machine to notify the user that access to the network resource is granted and to allow the user to access the network resource. If the plurality of macro steps are not successfully executed to obtain all of the access rights because the user does not qualify for one or more of the access right requirements, denial instructions for the access right management computing machine can notify the user that access to the network resource is denied and to prevent the user from accessing the network resource.

In some embodiments, the asset right management GUI can contain a first hyperlink to allow the user to change a user role for which the network resource is requested. Various user roles could be a developer, application user, manager, and/or any other guest, employee, or manager type role.

In some embodiments, the asset right management GUI can display a status of the request such as, for example, whether the request is pending, approved, or denied.

In some embodiments, the asset right management GUI can contain a second hyperlink to allow the user to request help information. The help information could provide aid regarding an approval process, the rights required to access a network resource, the various options for user roles that could be selected, an explanation as to why a resource request was denied, or information regarding who to contact or how to follow up if a request for a network resource is not approved.

In some embodiments, an access right management computing platform for controlling access to a network resource, coupled to a network, can be used when a user requests access to the network resource. The platform can include: a client computing machine having at least one client processor, at least one client communication interface communicatively coupled to the at least one client processor and the network, and client memory communicatively coupled to the client communication interface. The client memory can store client computer-readable instructions that, when executed by the at least one client processor, cause the client computing machine to perform various actions. The at least one client processor can identify the user based on single sign-on authentication. The at least one client processor can generate a request for access to the network resource based on user input. The at least one client processor can transmit via the client communication interface the single sign-on authentication and the request to a server computing machine. The at least one client processor can display a status of the request. The server computing machine can have: at least one server processor, at least one server communication interface communicatively coupled to the at least one server processor and the network, server memory communicatively coupled to the server communication interface. The server memory can store server computer-readable instructions that, when executed by the at least one server processor, cause the server computing machine to perform various functions. The at least one server processor can receive, by the at least one server communication interface from the at least one client processor, the single sign-on authentication and the request. The at least one server processor can authenticate the user based on the single sign-on authentication. The at least one server processor can execute an authentication macro to obtain all approvals required for the user to access the network resource. The macro can include a plurality of authentication steps in order to obtain all of the necessary approvals. The at least one server processor can communicate to the at least one client processor, via the communication interfaces, a result for the request for the network resource. The user may be allowed access to the network resource if all of the necessary approvals were successfully obtained. Otherwise, the user may be precluded from accessing the network resource and the reasons for the denial may be communicated to the user.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. Various aspects of the disclosure and/or embodiments may be implemented on a private, semi-private, and/or public basis; may be structured internally within a company environment, externally outside a company environment, and/or partially inside and partially outside the company environment; and may be accomplished in one or more standalone and/or distributed configurations. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As used throughout this disclosure, computer-executable software and/or data can include one or more: algorithms, applications, application program interfaces (APIs), attachments, big data, collectors, daemons, data analytic processors, emails, encryptions, databases, data repositories, data structures (including cubes, hypercubes, data warehouses, datasets, etc.), data sources, drivers, file systems or distributed file systems, firmware, graphical user interfaces, images, instructions, machine learning, middleware, modules, multidimensional databases, multidimensional database management systems, multidimensional data structures, objects, online analytical processing (OLAP applications, cubes and data storage, relational databases, etc.), operating systems, processes, protocols, programs, repositories, scripts, source code, tools, utilities, and VPNs. The computer-executable software and data is on tangible, computer-readable memory (local, in network-attached storage, remote, and/or online), can be stored in volatile or non-volatile memory, and can operate automatically and/or autonomously, based on event triggers, on-demand, on a schedule, and/or as part of batch processing. It can operate in real time or otherwise.

"Computer machine(s)," "computer platform(s)," "computing environment(s)," "computing infrastructure(s)," "logical architecture(s)," and/or combinations of one or more of the foregoing as well one or more aspects of integrated and/or distributed implementations thereof and/or at least partial implementation of functionality described herein, or the like can include one or more: special-purpose network-accessible administrative computers, clusters, computing devices or computing machine(s), computing platforms, desktop computers, distributed systems, enterprise computers, laptop or notebook computers, controlling computers, nodes, personal computers, portable electronic devices, servers, controlled computers, smart devices, tablets, and/or workstations, which have one or more microprocessors, cores, and/or executors such as for executing or accessing the computer-executable software and data. References to computer machines, platforms, environments, infrastructures, architectures, and names of devices included within the foregoing definition(s) are used interchangeably in this specification and are not considered to be limiting or exclusive to only a specific type of device or location of the device; specific type of user or location of the user; or specific location of types of functionality (e.g., standalone, distributed, in-network, or external). Instead, references in this disclosure to computing machines, computing environments, computing platforms, logical architectures, and/or described functionality incorporated in any of the foregoing, and the like are to be interpreted broadly as understood by skilled artisans.

As used in this specification, computer machines, platforms, environments, and logical architectures and/or implementations therein also include all hardware and components typically contained therein such as, for example, processors/executors/cores 111, volatile and non-volatile memories 112, modules in memory 112A-112U, communication interfaces 113, monitor(s) 114, and keyboards (not shown) or other input devices (not shown) etc.

Volatile and non-volatile memories 112 may be comprised of one or more internal, external, removable, and/or network-accessible computer-readable media, and may contain a plurality of sectors. As used herein, a "sector" is broadly defined as subdivision(s) or block(s) of memory and is not limited to the minimum storage unit of a hard drive or other computer-readable medium. Further, the sector may have a fixed size or may be variable.

Computer "networks" can include one or more local area networks (LANs), wide area networks (WANs), the Internet and public networks 180, wireless networks, digital subscriber line (DSL) networks, frame relay networks, asynchronous transfer mode (ATM) networks, private networks 170, virtual private networks (VPNs), or any combination of any of the same. Networks also include associated "network equipment" such as access points, ethernet adaptors (physical and wireless), firewall(s) 175, hubs, modems, routers, security devices, and/or switches located inside the network and/or on its periphery, as well as software executing on and/or implementing any of the foregoing.

Figure 1A:
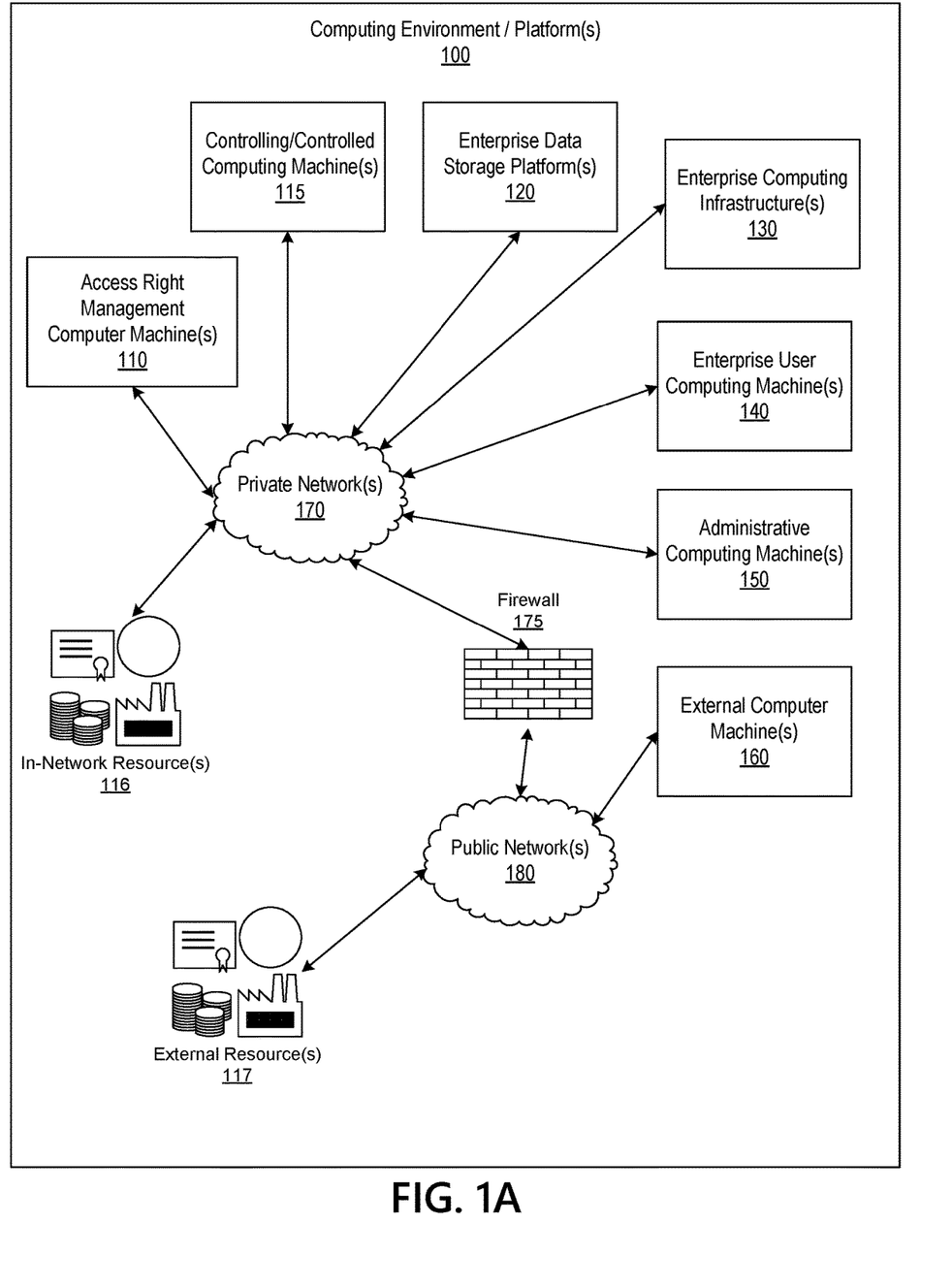
FIGS. 1A and 1B depict illustrative computing environment(s), client-server configurations, access right management computer machines, platform(s), and/or module(s), in accordance with one or more environments, for providing streamlined approval and provisioning of network resources and managing of network resources while maintaining information security.

FIG. 1 depicts a various aspects of illustrative computing environment(s)/platform(s) 100, in accordance with one or more aspects of this disclosure, for providing streamlined approval and provisioning of network resources and managing of network resources while maintaining information security. Computing environment/computing platform(s) 100 may include one or more in-network and/or external computer machine(s), system(s), and/or platform(s).

For example, computing environment 100 may include various computer machine(s) such as one or more access right management computer machine(s) 110 (e.g., for setup, macro creation, performing authentication, widget configuration, receiving access requests, processing access requests, widget creation, creating graphical user interfaces, implementing any other functionality described or referenced in the flow diagrams in this application, etc.), controlling and/or controlled computer(s) 115 (e.g., for distributed processing, load balancing, data storage, etc.), enterprise data storage platform(s) 120 (e.g., for storing any of the software and/or data referenced herein), enterprise computing infrastructure 130 (e.g., for implementing company-specific or other network functionality or computer software and data, for providing various enterprise and/or back-office computing functions for an organization, etc.), enterprise user computing machine(s) 140 (e.g., used by software developers or technologists to request access to a network resource, to interact with or control access right management computer machine 110, to provide approvals or rejections by network resource owners or managers, etc.), administrative computing machine(s) 150 (e.g., used to manage functionality, provide or control access rights, manage network resources, etc.), and external computer system(s) 160 (e.g., for remote access, remote implementation or management of any functionality described herein, remote processing, and/ or performing any other remote functions or actions). In addition, client-server arrangements may be implemented using one or more of the foregoing. For example, the access right management computer machine(s) 110 could be implemented as or on one or more server(s) to provide services and functions to one or more client machines such as enterprise user computing machine(s) 140, administrative computer machine(s) 150, external computer system(s) 160, one or more other infrastructures, and the like.

As illustrated in greater detail below, each element in computing environment 100 may include one or more computing machine(s) and associated components operating computer software and data configured to perform one or more of the functions described herein. Moreover, the functions performed by one machine or platform, or in one infrastructure, could be implemented on another machine, platform, or infrastructure in the environment in accordance with one or more various aspects of this disclosure.

Computing environment 100 may include one or more in-network resources 116 or external network resources 117. Additionally, and/or alternatively, network resources 116, 117 may be implemented, in whole or in part, internally as part of one or more of any of computer machine(s) 110, controlling and/or controlled computer(s) 115, enterprise data storage platform(s) 120, enterprise computing infrastructure(s) 130, enterprise user computing machine(s) 140, administrative computing machine(s) 150, and/or external computer system(s) 160.

Computing environment 100 also may include one or more networks, which may directly or indirectly interconnect one or more of computer machine(s) 110, controlling and controlled computer machine(s) 115, in-network or external network resources 116, 117, enterprise data storage platform(s) 120, enterprise computing infrastructure(s) 130, enterprise user computing device(s) 140, administrative computing device(s) 150, and external computer system(s) 160.

Computing environment 110 may include one or more firewalls 175, which protect or filter data for machines, platforms, data and the like inside the private network from unauthorized users or processes operating inside and/or outside the private network.

In one or more arrangements, computer machine(s), platform(s), and other system(s) included in computing environment 100 may be any type of computing device(s) capable of providing a user interface, receiving input via the user interface, acting on the input, accessing or processing data, controlling other computer machine(s), platform(s), infrastructure(s), and/or component(s) of any of the foregoing based on the input, communicating the received input to one or more other computing machine(s), and propagating software and/or data to other machine(s), platform(s), system(s), repositories, data source(s)/data store(s), and the like. As noted above, and as illustrated in greater detail below, any and/or all of the computer machine(s) of computer environment 100 may, in some instances, be special-purpose computing device(s) configured to perform specific functions.

Figure 1B:
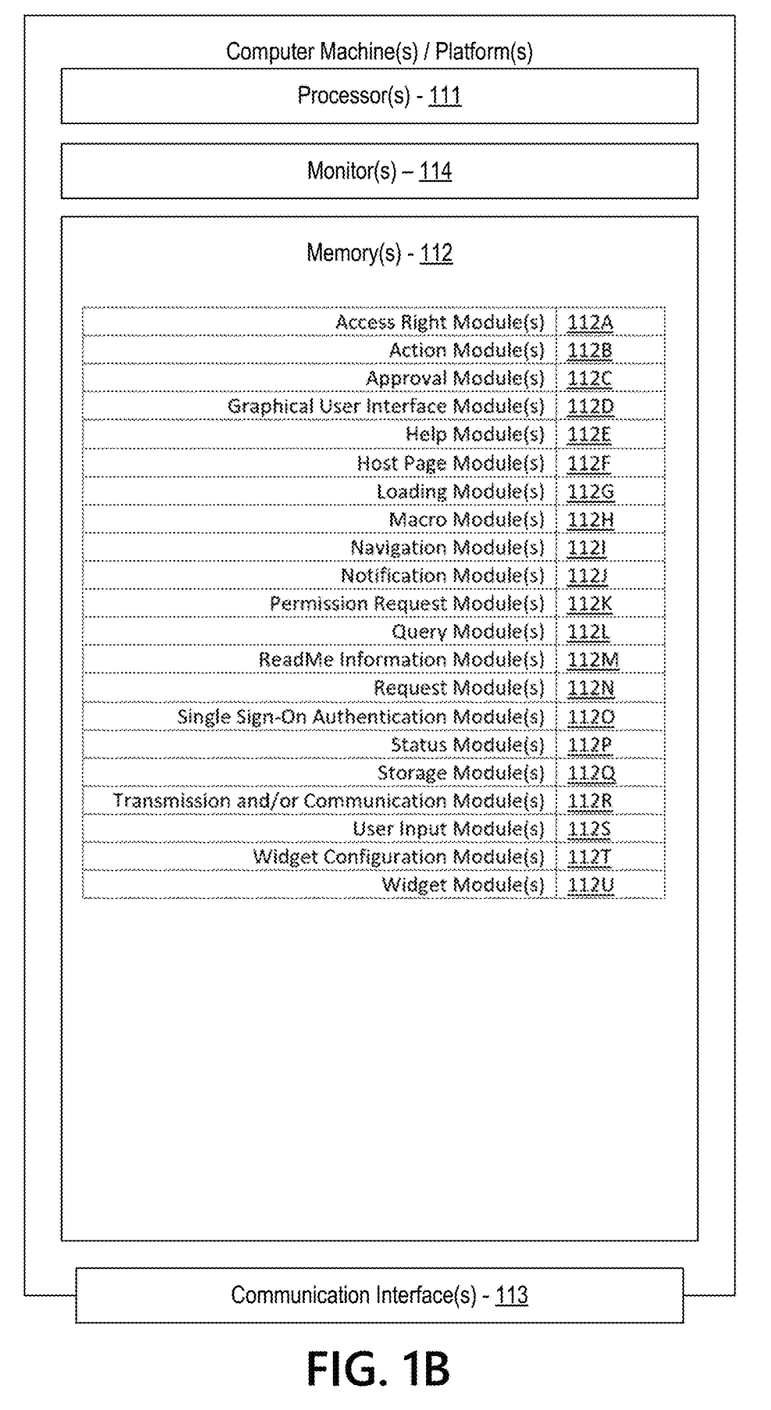

Referring to FIG. 1B, one or more computer machine(s) or platform(s), such as, for example, access right management computer machine(s) 110, may include one or more processors, executors, cores, etc. 111, memory 112, communication interface 113, and monitor(s) 114. A data bus may interconnect processor 111, memory 112, communication interface 113, and/or monitor(s) 114. Communication interface 113 may be a network interface configured to support communication between one or more computer machines in computer environment 100 and one or more networks (e.g., private network 170, public network 180, or the like).

Memory 112 may be volatile or non-volatile, and may include computer software and data such as, for example, one or more program modules having instructions that when executed by processor 111 cause a computer machine, such as computer machine(s) 110, to perform one or more functions described herein and/or illustrated in FIGS. 3-9. In some instances, one or more program modules, data, and/or databases may be stored by and/or maintained in different memory units (local or accessible across the network) of computer machines and/or by different computing devices that may form and/or otherwise make up a collection of computer machines.

Sample program modules, data, and/or databases stored or maintained in memory may include, but are not limited to: Access Right Module(s) 112A for managing access rights of network resources; Action Module(s) 112B to implement any functionality described in any of the figures; Approval Module(s) 112C for approving requests to access network resources if all permissions rights are obtained; Graphical User Interface Module(s) 112D for display of graphical user interfaces or graphical objects such as widgets and buttons in order to enable interaction with access right management requests, denials, and approvals; Help Module(s) 112E to provide instructions to users regarding how to request access rights and explanations to users regarding the request, denial, and approval process; Host Page Module(s) 112F for generating host HTML pages, Loading Module(s) 112G to load network resources and/or information regarding the resources into an access right management system; Macro Module(s) 112H to assign authentication and/or approval steps for a button or widget required to obtain network resource access rights such that a user only needs to make a single request in order to obtain access to a network resource; Navigation Module(s) 112I to navigate between host, help, and other pages; Notification Module(s) 112J to provide notifications to the user regarding whether a network resource access request was approved, denied, is pending, etc., Permission Request Module(s) 112K to request permission for access to a network resource; Query Module(s) 112L to provide search functionality for identifying resources, identifying managers, or providing search capabilities relating to access right management; ReadMe Information Module(s) 112M for providing instructions to users to explain various aspects of the process, timing, etc.;

Request Module(s) 112N to request access to a network resource; Single Sign-On Authentication Module(s) 112O to authenticate a user and determine access rights for the user; Status Module(s) 112P to identify the current status of a previous request for access to a network resource; Storage Module(s) 112Q to store data, requests, rights, network resources, etc.; Transmission and/or Communication Module(s) 112R to enable communication between clients, administrators, technologists, platforms, databases, machines, network resources, etc.), User Input Module(s) 112S to receive input from users responsive to input functionality on HTML pages and/or graphical user interfaces; Widget Configuration Module(s) 112T to create macros, steps, graphical user interfaces etc. for requesting and obtaining network resource access rights; and/or Widget Module(s) 112U to generate graphical user interfaces corresponding to a button or other widgets that have been created to facilitate a single request to obtain all necessary access rights for a network resource.

Figure 2:
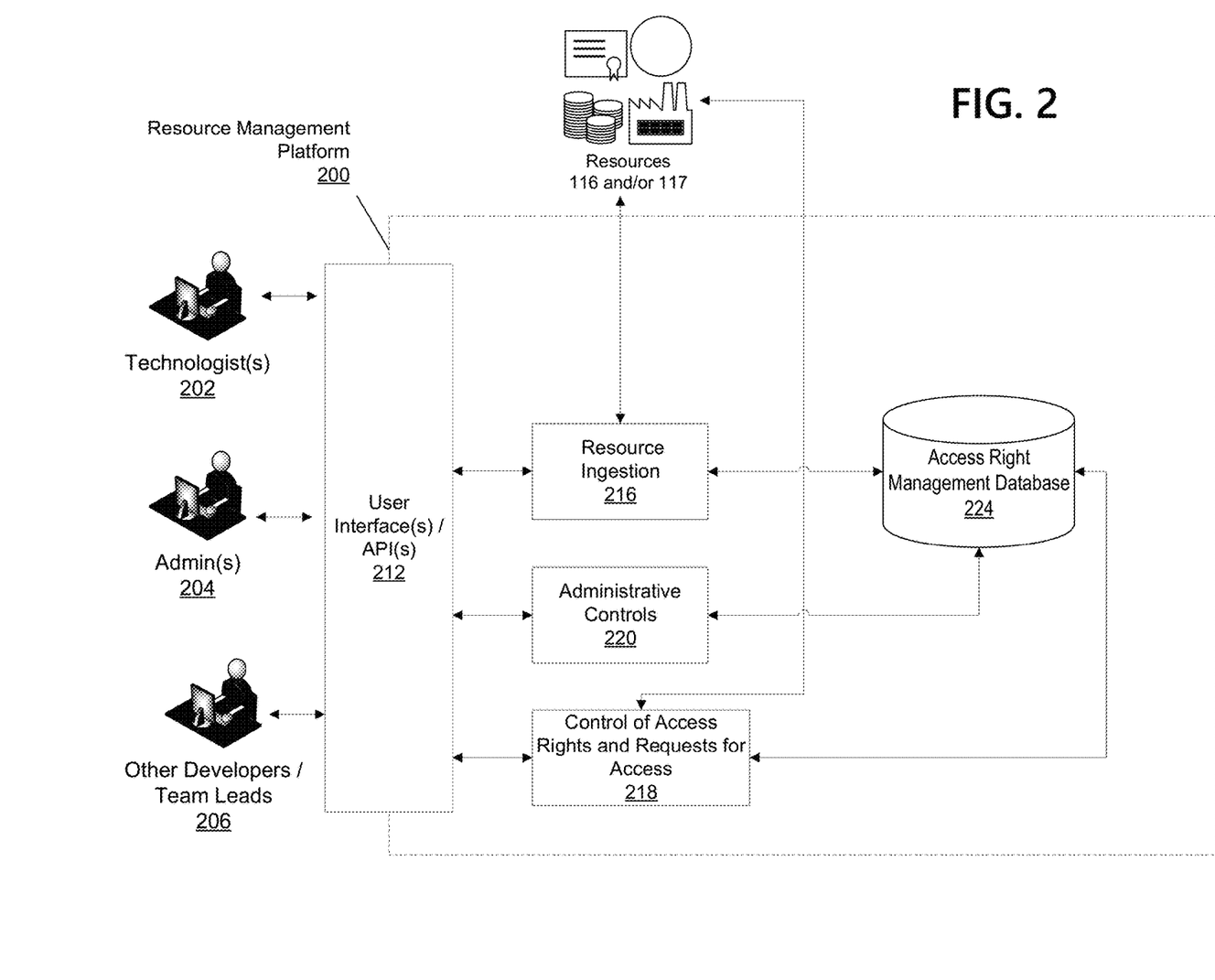
FIG. 2 depicts an illustrative high-level logical architecture for implementing one or more aspects of this disclosure.

Referring to FIG. 2, a sample illustrative logical architecture for implementing one or more aspects of this disclosure is shown. A resource management platform 200 can incorporate various elements, components, and functionality in order to facilitate requesting access to network resource(s) 116, 117 and managing requests for access to the network resource.

Technologists 202, administrators 204, and previously and/or concurrent other developers/team leaders/managers 206 for network resources, can each interact with resource management platform 200, via one or more user interfaces/APIs 212, as well as with resource ingestion 216 functions that integrate new resources into the platform in order to use the system to control access to the network resource, administrative control functions 220 to control access to the network resource by assigning rules or prerequisites for access to the network resource as well as for identifying toxic or mutually exclusive access rights for users, and functionality to control access rights and requests for access 218 by applying rules and executing macros in the access right management database 224 or the like. More specific discussions of platform 200 functionality and corresponding computer software and/or data is explained below in reference to other figures in this disclosure.

Figure 3:
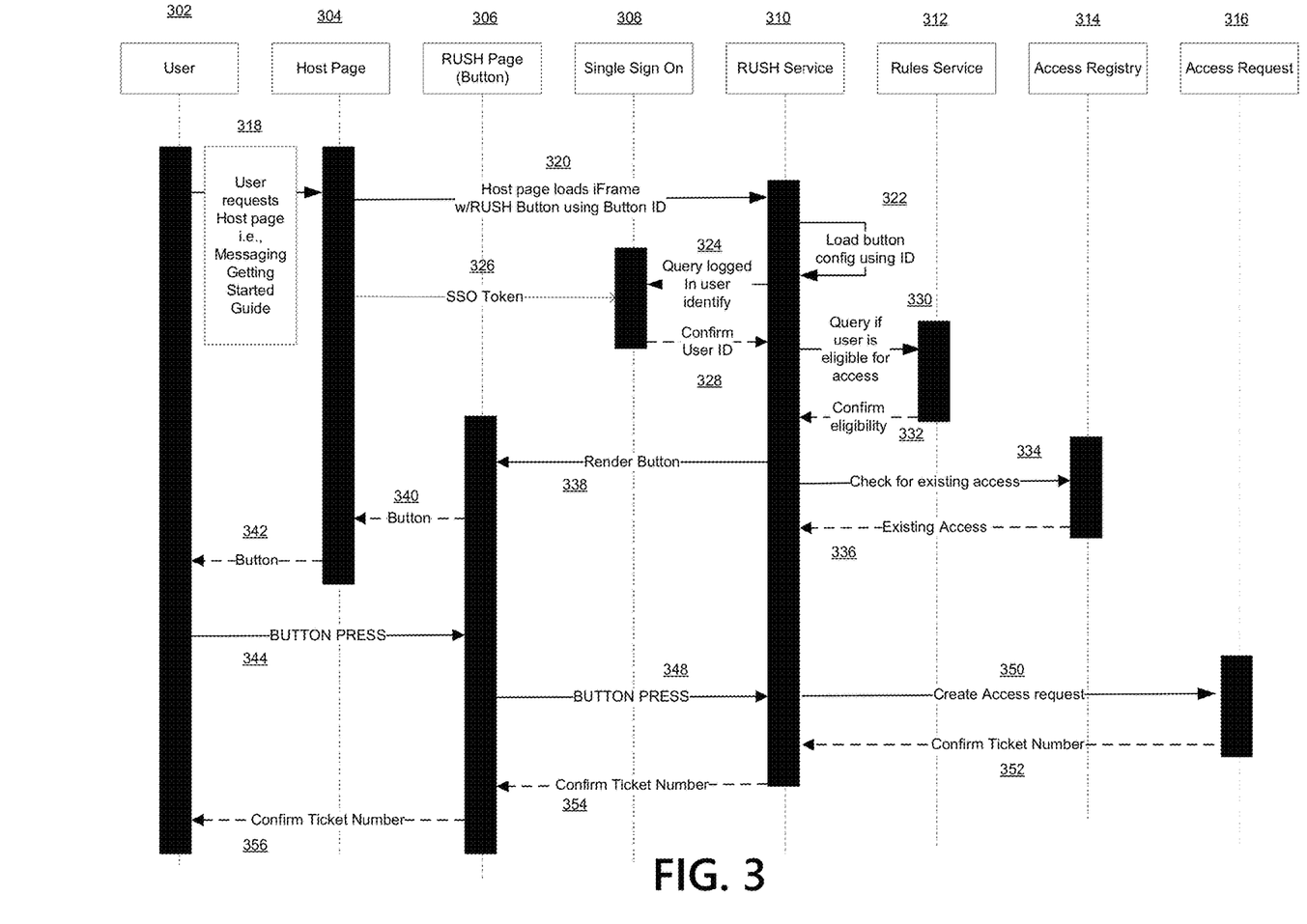
FIG. 3 depicts an illustrative high-level swim-lane diagram for implementing one or more aspects of this disclosure.

FIG. 3 depicts an illustrative high-level swim-lane diagram for implementing one or more aspects of this disclosure. The swim-lane diagram shows the relationships and data flow between a user 302, a host page 304, a rush page button or widget 306, single sign-on authentication 308, a rush service 310, a rules service 312, an access registry 314, and access requests 316.

A user 302 can initiate the process by navigating to or requesting 318 a host page 304. The initial page may be implemented in HTML or another format. A sample host page 304 could be a getting started guide or other suitable landing page. Desired content could be implemented on the page or embedded.

The host page can load an inline HTML frame (i.e., iFrame) 320 with a rush button using a button identifier. This can be loaded from a rush service 310. The load button configuration can be initiated by using a button identifier 322. The rush service 310 can query 324 the identity of the user that is logged in and requesting access to the network resource. This user identification can be made by a single sign-on (i.e., SSO) authentication token, which can confirm user identification 328 to the rush service.

The rush service can query 330 a rules service or access right management database in order to determine if the authenticated user is eligible for access to the network resource. This could include determining if a user has access to one resource that would preclude the user having access to a second resource based on a toxic mutually exclusive relationship between the resources. For example, the first resource might be related to a first project and the second resource might be related to a second project. It may be that there is a conflict of interest between people working on or using the first resource and the second resource. Hence, the user might be able to have access to one resource but not the other. The rules service 312 can confirm eligibility 332 to the rush service 310.

The rush service can also check the access registry to determine whether the user already has access to the network resource 334, 336. If eligibility is confirmed 332, a widget or button could be created 338 to allow a user to request all access rights required for a network resource or to identify for the user that they already possess the access rights necessary for the network resource.

The button can be displayed 340 on the host page and clickable access to the button can be provided to the user 342. If the user clicks the button 344 in order to request access to the network resource, the button press can be communicated 348 to the rules service. An access request can be created 350 based on all of the approvals necessary for the particular button configuration and a tracking ticket can be provided in response to the access request 352, 354, 356.

Figure 4:
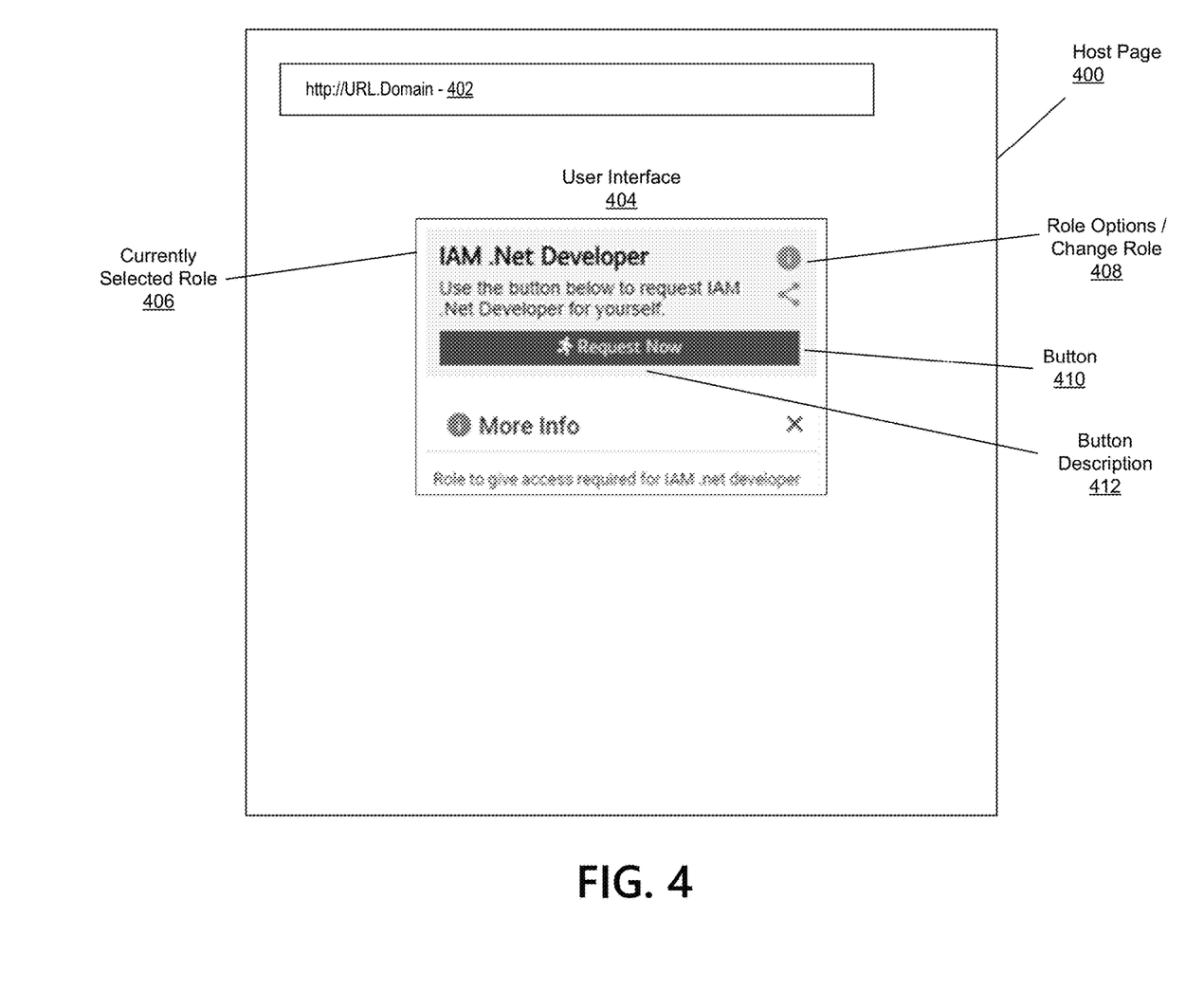
FIGS. 4-7 depict illustrative graphical user interfaces and potential widget displays in accordance with one or more aspects of this disclosure.

FIGS. 4-7 depict illustrative graphical user interfaces and potential widget displays in accordance with one or more aspects of this disclosure. In FIG. 4, a host page 400 can be displayed to a user. This could be the landing page for when the user decides to request access to a network resource. The host page 400 can have a URL 402 associated therewith. The host page 400 can be accessed by a web browser or other application that navigates to the particular URL for landing page for the network resource. The button or widget can have its own graphical user interface 404. The graphical user interface can display the currently selected role for the user 406 and this role can be changed 408 if necessary by the user. This could be helpful if a user has, for example, limited access rights based on being a member of a lower user group or more access rights based on being a member of a higher access group. The rush button or widget 410 can be a graphically selectable HTML object and selecting the object can trigger a request for identity and access management (IAM) for the network resource. A description of the button, widget, or user interface can also be provided 412 in various locations on the page. In the example of FIG. 4, the user does not currently have access to a network resource and would like to request IAM as a .NET Developer as opposed to merely a lower level user of the network resource such as an application user or application client.

Figure 5:
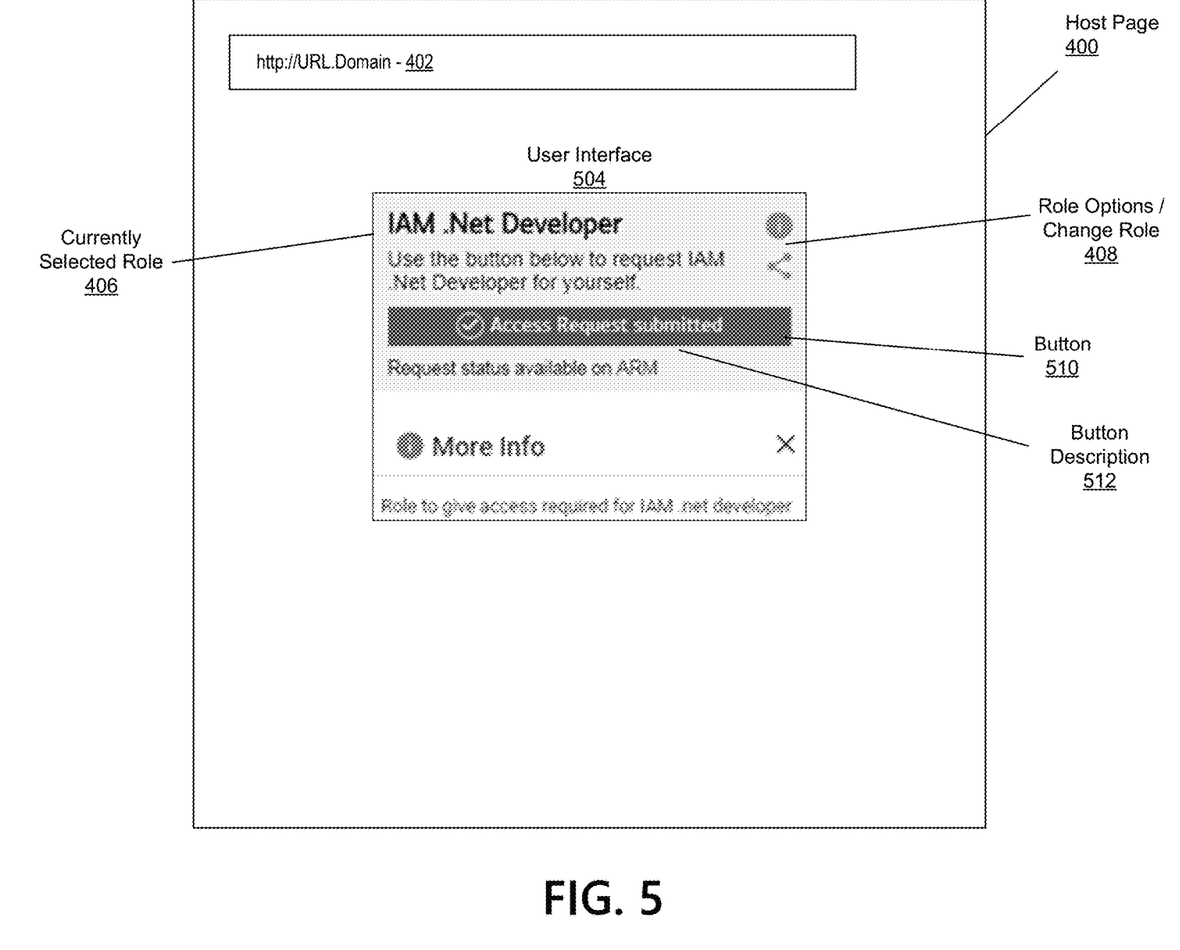

In FIG. 5, the host page 400 can display a different user interface 504 after the rush button or widget 410 was selected in FIG. 4. The button 510 and button description(s) 512 could then be updated to reflect that the access request has been submitted and/or that the request status may be available by navigating to an access right management (ARM) page.

Figure 6:
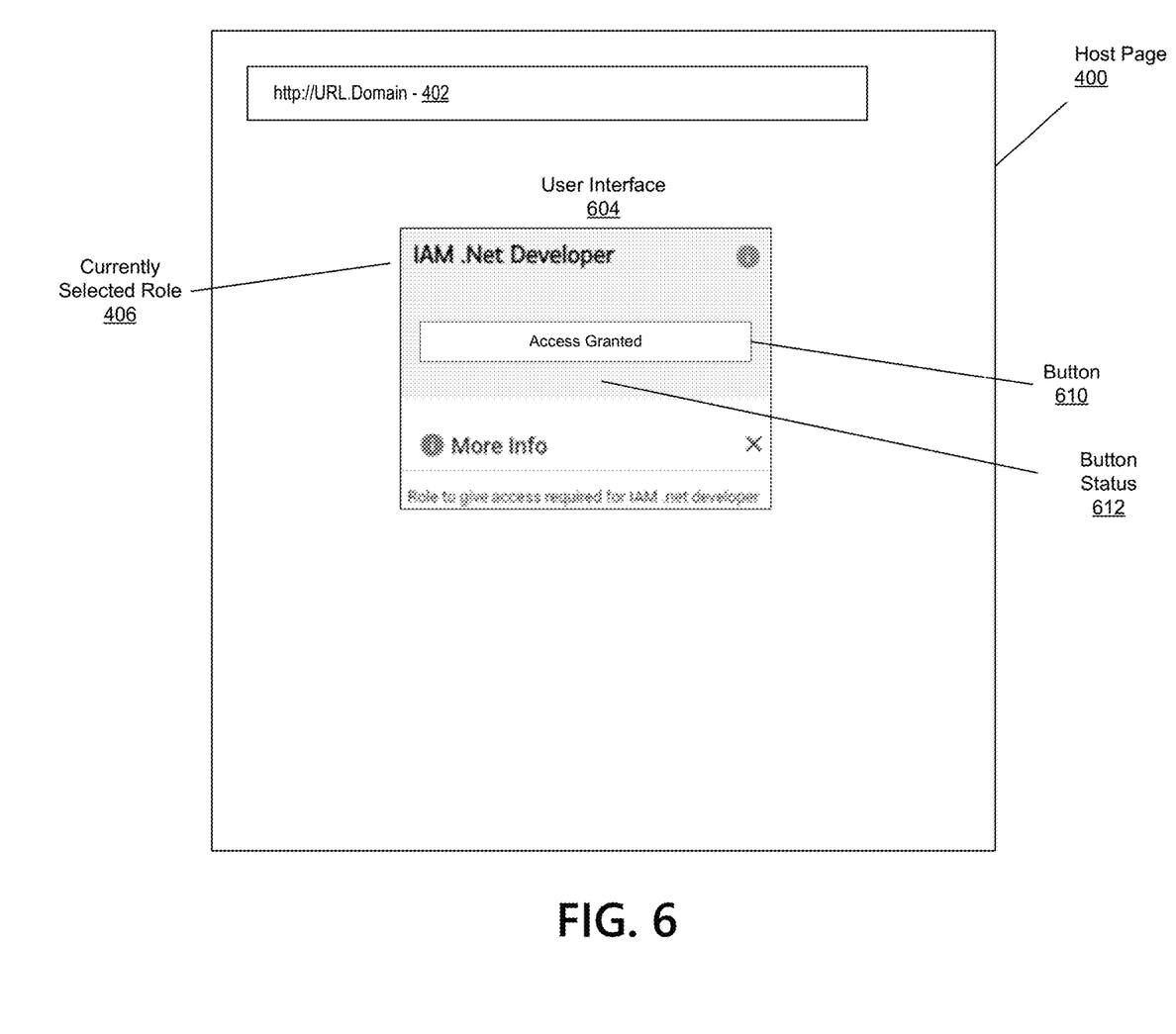

In FIG. 6, the host page 400 may display a user interface 604 with an updated button 610 indicating the status of the access request such as, for example, that the network resource request was granted and can have a corresponding button status description 612.

Figure 7:
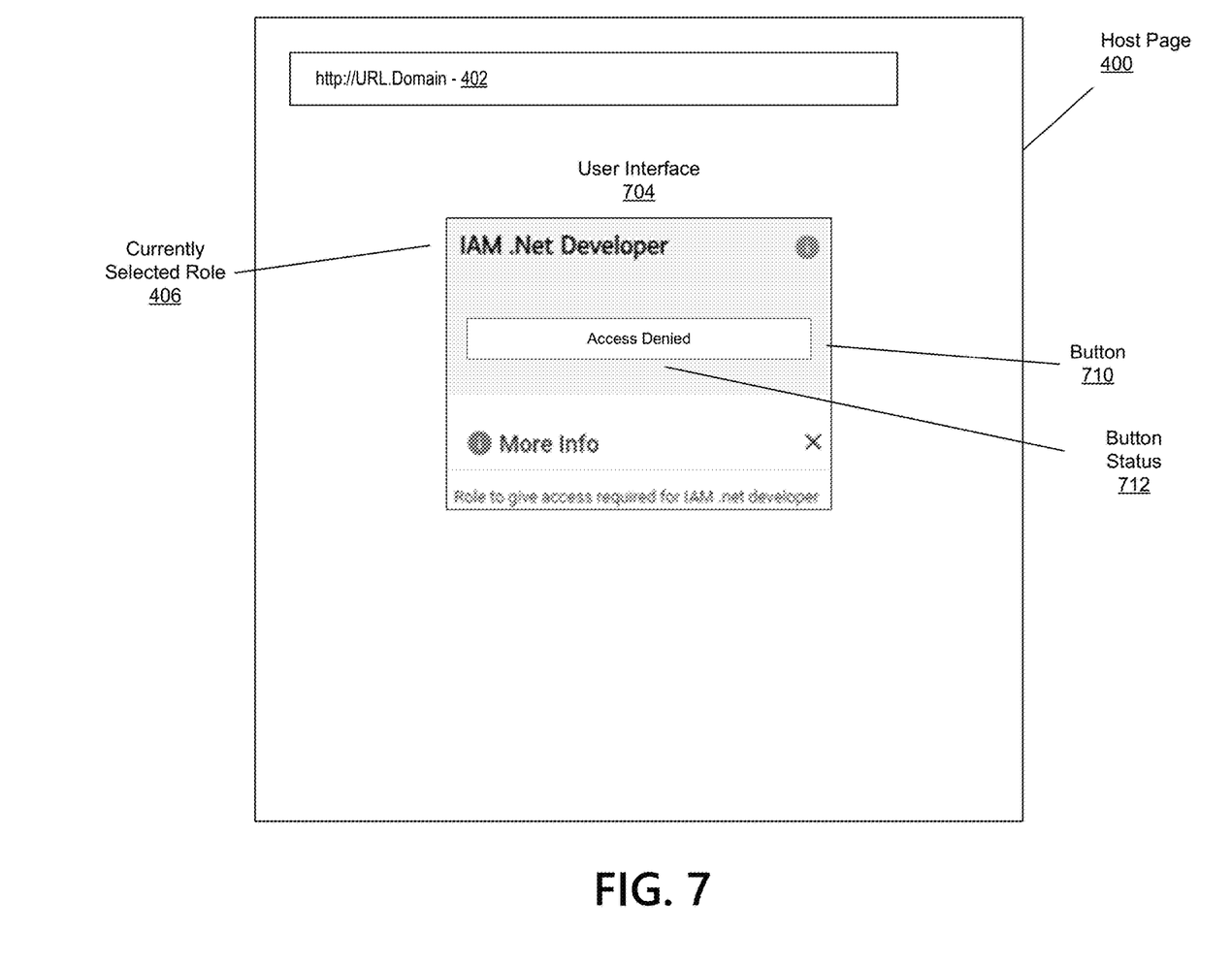

Similarly, in FIG. 7, the host page 400 may display a user interface 704 with an updated button 710 indicating the status of the access request such as, for example, that the network resource request was denied and can have a corresponding button status description 712.

Figure 8:
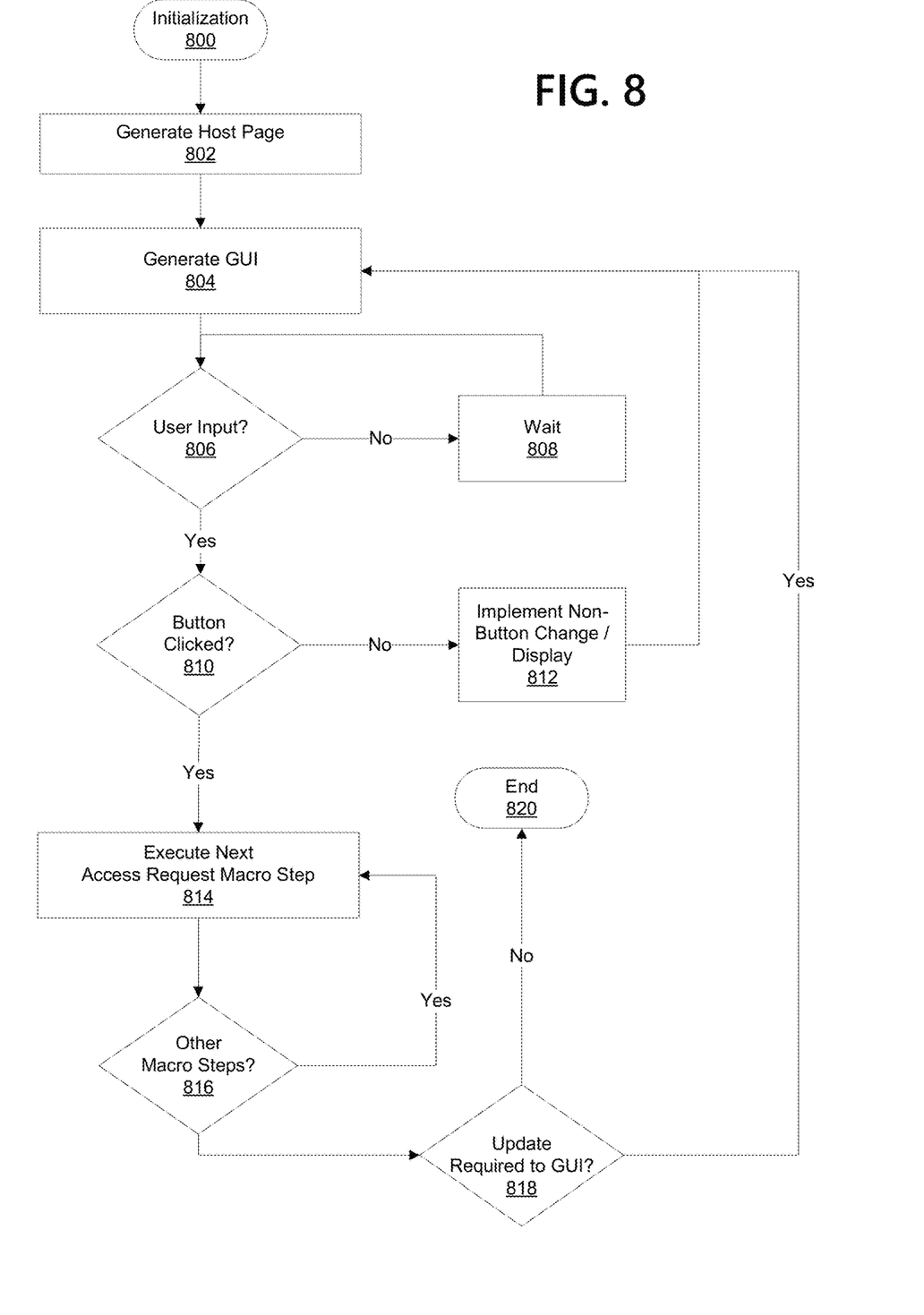
FIG. 8 shows an illustrative high-level process flow diagram for implementing one or more aspects of this disclosure.

A sample high-level process flow for one or more aspects of this disclosure can be seen in FIG. 8. A user can initiate the process to request access to a network resource by navigating to a URL for a host page for the network resource. In response to the user entering a URL into the web browser or the like, the access right management computing machine can generate or display a host page for the network resource 802 and can generate a graphical user interface 804 containing a button or widget or the like. The rendered host page and GUI is then displayed for the user. The system can then accept user input 806 and/or wait for user input 808.

If a user selects a non-button option on the host page, then the display can be modified based on the user's selection 812 and the display can be regenerated 804. An example of this is when the user changes the role for which the access rights are requested.

Alternatively, if a user requests access to the network resource by clicking the button 810, the first set of access right(s) can be requested. This process can be repeated as necessary to sequentially request and obtain each access right necessary for the network resource. As an example, a resource may require approval from a first group, a second group, and a third group. Each macro step could be a separate request to each group. Hence, in this example, three separate approval macro steps would be executed. As the content for the graphical user interface changes such as, for example, to indicate that the request is pending, that the request was denied, that the request was approved, the graphical user interface can continuously be updated 818, 804 until the process is completed 820.

Figure 9:
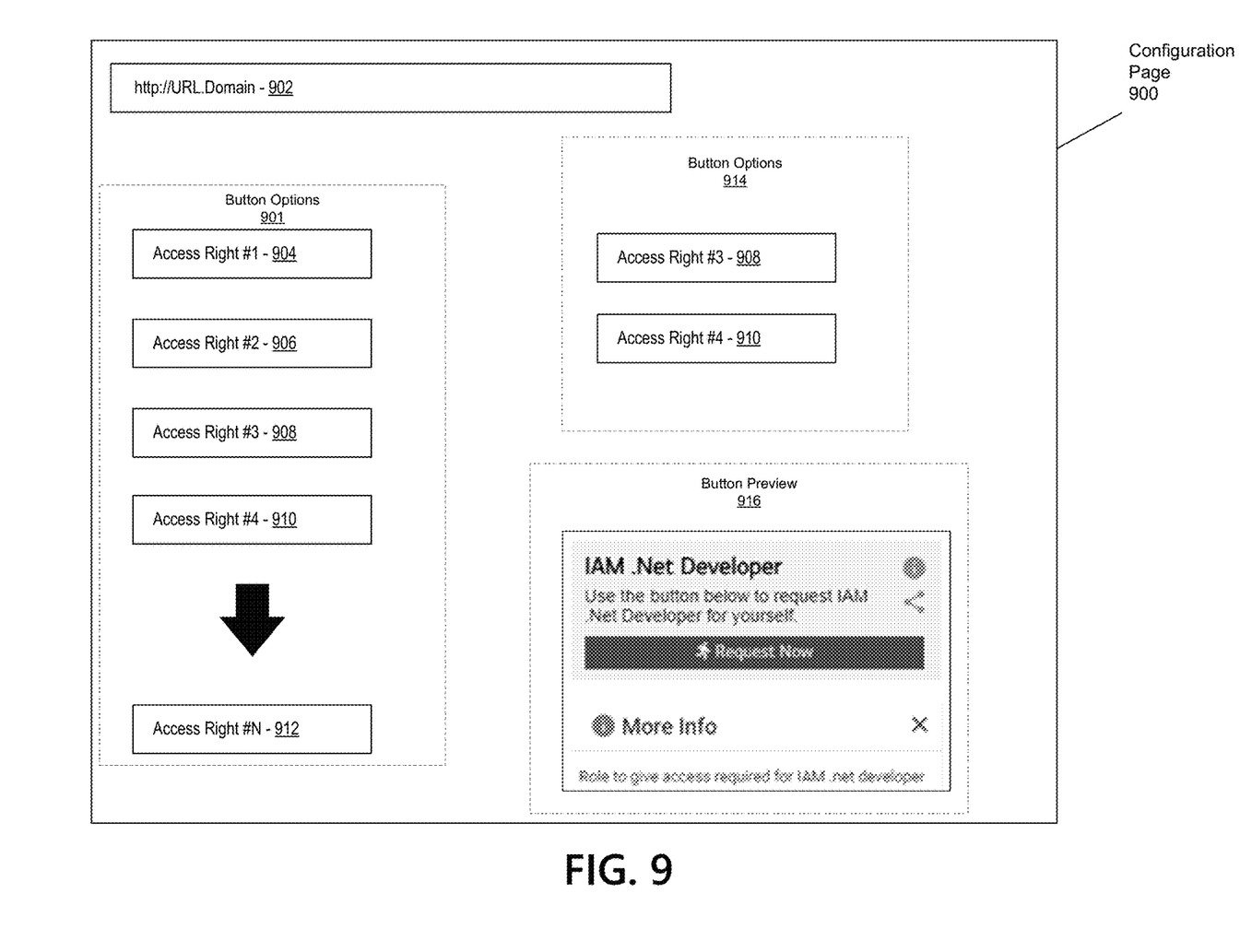
FIG. 9 depicts an illustrative button configuration screen for implementing one or more aspects of this disclosure.

FIG. 9 depicts an illustrative button configuration screen 900 for implementing one or more aspects of this disclosure. A developer, administrator, or resource manager can navigate to a URL 902 in order to configure access rights for a network resource and to setup up button configuration for particular users.

The graphical user interface 900 can include an options section 901 listing all of the options for a particular resource. It could list various potential options such as requiring a first access right requirement or group of requirements 904, a second right or group of requirements 906, a third right or group of rights 908, a fourth right or group of requirements 910, and so on up to any arbitrary number of possible access rights or groups of rights 912.

Required access rights for a particular user for a particular network resource can be selected in 901 or dragged graphically to a button options section 914 of the configuration page. In this particular example, the .Net Developer would need to possess Access Right #3 908 and Access Right #4 910.

A preview 916 of the button configuration and display can be shown in a preview button preview portion of the button configuration page 900. The preview can be updated automatically as access rights are assigned to the button or can be generated manually.

There are multiple benefits of various aspects of this disclosure. Instead of requiring complex and confusing comprehensive documentation on everything that is required in order to access a network resource, a simple instruction landing page can be created. A user can select an appropriate user role for which access rights are requested. A customized button for a particular user role can be set up to automatically request all access rights with a single click. The user does not have to understand all of the complexities required to gain access. The user simply needs to select the appropriate options and then click a single button. All access right requests can be triggered automatically as a series of macros or other steps. The status and results of the process can then be communicated to the user. This simplifies and expedites an otherwise complex approval process. It promotes good governance, easy administration, and ease of use while simultaneously maintaining existing information security.

One or more aspects of the disclosure may be embodied in computer-usable data or computer-executable software or instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer-executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers, computing platforms, and/or one or more networks. The functionality may be distributed in any manner or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A non-transitory computer-readable medium with computer-executable instructions stored thereon executed by a processor on an access right management computing machine to control access, by a user operating a user computing machine, to a network resource controlled by network resource managers, said access right management computing machine and said user computing machine coupled to a network, said computer-executable instructions comprising:
   a. executing single sign-on (SSO) authentication instructions for the access right management computing machine to authenticate and identify the user based on a SSO authentication token;
   b. allowing, by the access right management computing machine, access to the network resource if the user possesses all access rights;
   c. if the user does not possess said all access rights:
   d. identifying, by the access right management computing machine, missing authorizations;
   e. executing, by the access right management computing machine, widget configuration instructions to generate a widget having an authorization macro of a plurality of authorization requests required for the user to secure the missing authorizations;
   f. generating, in a first graphical user interface (GUI) on the user computing machine, the widget to enable the user to request the missing authorizations with a single selection of the widget;
   g. receiving, by the access right management computing machine from the user computing machine, the single selection of the widget by the user to request the missing authorizations;
   h. triggering, by the access right management computing machine in response to the single selection of the widget, the authorization macro to transmit the plurality of authorization requests to the network resource managers in order to secure the missing authorizations;
   i. receiving, by the access right management computing machine from the network resource managers, responses to the plurality of authorization requests;
   j. allowing, by the access right management computing machine, the user to access the network resource if the network resource managers approve of the plurality of authorization requests; denying, by the access right management computing machine, the user access to the network resource if at least one of said network resource managers deny at least one of the plurality of authorization requests; and
   k. displaying, in a second GUI on the user computing machine, a result of the authorization macro.

2. The non-transitory computer-readable medium of claim 1 wherein the second GUI contains a help hyperlink to allow the user to request help information.

3. The non-transitory computer-readable medium of claim 2 wherein the help information describes an approval process to secure the missing authorizations and provides contact information for one or more of said network resource managers to facilitate obtaining the missing authorizations.

4. The non-transitory computer-readable medium of claim 3 wherein the second GUI contains a denial explanation to explain to the user which of said access rights were not successfully obtained.

5. The non-transitory computer-readable medium of claim 4 wherein the result is a status of the request the missing authorizations.

6. The non-transitory computer-readable medium of claim 5 wherein the status is displayed as pending.

7. The non-transitory computer-readable medium of claim 5 wherein the status is displayed as approved.

8. The non-transitory computer-readable medium of claim 5 wherein the status is displayed as denied.

9. The non-transitory computer-readable medium of claim 2 wherein the help information describes a user role for which access to the network resource may be requested.

* * * * *